Jan. 1, 1963  K. GEBELE  3,071,058
PHOTOGRAPHIC CAMERA
Original Filed Sept. 24, 1959  3 Sheets-Sheet 2

United States Patent Office 3,071,058
Patented Jan. 1, 1963

3,071,058
PHOTOGRAPHIC CAMERA
Kurt Gebele, Munich, Germany, assignor to Compur-Werk Friedrich Deckel oHG., Munich, Germany, a firm of Germany
Original application Sept. 24, 1959, Ser. No. 842,145, now Patent No. 3,044,377, dated July 17, 1962. Divided and this application Dec. 29, 1960, Ser. No. 79,313
Claims priority, application Germany Sept. 26, 1958
8 Claims. (Cl. 95—64)

The present invention relates to a photographic camera, and more particularly to setting the exposure value of a still camera.

An object of the invention is the provision of generally improved and more satisfactory exposure value setting mechanism.

Another object is the provision of exposure value setting mechanism which is relatively rugged and not likely to be damaged by operation under conditions likely to be encountered in actual use.

A further object is the provision of improved mechanism for automatically setting the diaphragm aperture in accordance with an exposure meter, when desired, the mechanism having provision for optionally setting the diaphragm manually rather than automatically.

A further object is the provision of mechanism for automatically setting the shutter speed as well as the diaphragm aperture, so that completely automatic setting of the exposure value is achieved.

A still further object is the provision of completely automatic setting mechanism so designed and constructed that the automatic features can be disconnected or made inoperative when desired to enable manual setting, the mechanism nevertheless remaining relatively simple.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
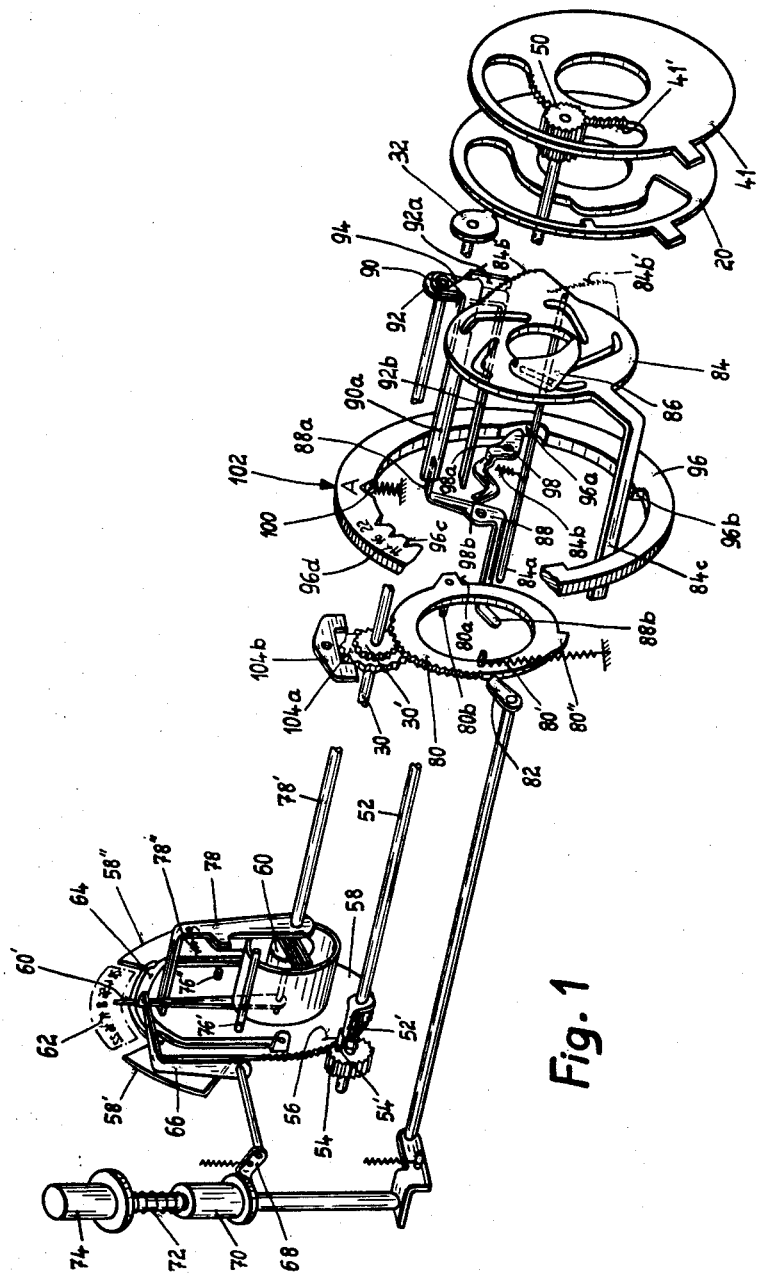
FIG. 1 is a schematic perspective view of the essential drive members in an embodiment of the invention which provides for manual setting of the shutter speed and automatic setting of the diaphragm aperture.
Figure 2:
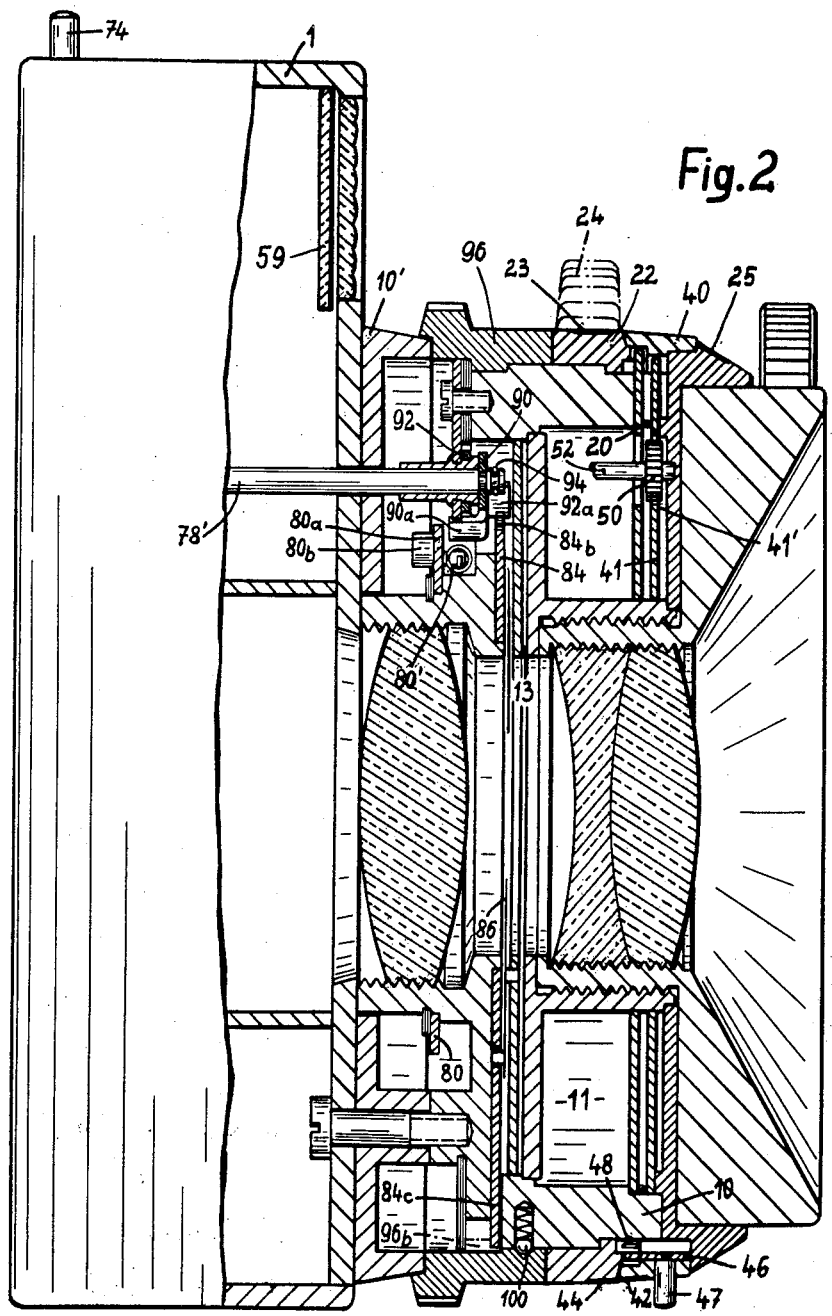
FIG. 2 is a view partly in elevation and partly in axial cross section, further illustrating the embodiment shown in FIG. 1.

Referring first to the embodiment of the invention illustrated in FIGS. 1 and 2, and initially referring mainly to FIG. 2, there is a photographic camera of any suitable known type and manner of operation, having a main body or housing 1 bearing on its front side a mounting ring 10' which encircles the optical axis. On this mounting ring there is mounted an objective shutter unit whose housing or casing is indicated in general at 10. Near the front of the housing the shutter contains the usual shutter speed control cam ring 20, rotatable about the optical axis and operatively coupled with an external speed setting ring 22 having operative knobs or finger grips 24. An exposure time scale 23 on the setting ring 22 cooperates with a stationary index mark 25 on a fixed ring near the front of the shutter unit, to enable the shutter to be set for the desired speed. The speed setting ring 22 is held against accidental rotation by any suitable holding means of known form, such as a frictional detent.

The shutter contains the usual annular space 11 in which is located the usual shutter operating or driving mechanism, and the usual shutter blades located within the annular space 13. Since the details of the shutter blades and of the mechanism for operating the shutter blades are subject to wide variation and are unimportant so far as the present invention is concerned, the blades and the operating mechanism have not been shown, in order to avoid complicating the drawing. The shutter operating mechanism may, for example, take the form disclosed in United States Patents 2,900,885 and 2,900,886, of Gebele, both issued August 25, 1959, or 2,943,551, of Gebele, issued July 5, 1960, this third patent corresponding in disclosure to British Patent 769,086 mentioned in the parent application of which this present application is a division. As customary in a shutter of this type or style, the shutter is usually cocked or tensioned by a shaft which is connected to the film winding or film transport mechanism in the camera body, so that the shutter is tensioned automatically and simultaneously when the film is advanced. The tensioning shaft is indicated fragmentarily at 30 in FIG. 1 of the present drawings, and corresponds in function to the shaft 14 in said second and third mentioned United States patents, and the shaft 20 in the first mentioned United States patent. This tensioning shaft 30, which lies parallel to the optical axis, is fixed to a tensioning disk 32 (corresponding to the tensioning disk 16 in the second and third patents) which serves to tension or cock the master member or main drive member of the shutter mechanism, and the shaft also carries a pinion 30' serving the function of the teeth 90 in the third patent, meshing with the teeth of the control ring 80 (corresponding to the control ring 76 in the third patent) to move this control ring to its tensioned position when the shaft 30 is rotated.

In front of the above mentioned shutter speed setting ring 22, there is another setting ring 40 likewise mounted concentrically about the optical axis as a center, this ring bearing on its periphery a film speed scale 42 which cooperates with a reference mark 44 on the shutter speed setting ring 22. A leaf spring 46 secured in the ring 40 has an end which engages selectively into one or another of a series of coupling notches 48 on the shutter speed setting ring 22, thus connecting the rings 22 and 40 to each other for conjoint rotation in any one of various selected positions of orientation, depending on the film speed or film sensitivity. A knob 47 secured to the leaf spring 46 and projecting radially outwardly through an opening in the ring 40, may be pressed radially inwardly to disengages the end of the spring from the notch in which it has been set, to enable the rings to be turned relatively to each other to a different position of orientation, for setting a different film speed.

The external setting ring 40 is permanently coupled to an internal setting ring 41 located within the shutter. This ring 41 has gear teeth 41' meshing with a pinion 50 fixed to a rotatable shaft 52 which extends rearwardly from the front portion of the shutter unit into the camera body. Near the rear end of the shaft 52, there is fixed thereto a driving disk 52' which is in engagement with a driving pin 54' on a pinion 54 which is rotatable on the shaft 52. A spring 56 interposed between the parts 52' and 54' urges these parts into engagement with each other.

The pinion 54 meshes with gear teeth on a supporting plate 58 rotatable in the camera body, which plate serves as a mounting plate for the measuring mechanism 60 (i.e., a moving coil galvanometer) of the photoelectric exposure meter, the photocell of which may be placed at any convenient point such as indicated schematically at 59 near the upper part of FIG. 2. It is desirable to use an exposure meter having linear characteristics, at least over that portion of the measurement range which is employed in automatically setting the exposure value. Thus if the exposure meter has linear characteristics, it can be brought into agreement with the linear shutter speed scale and film speed scale. Hence by turning the entire supporting plate 58 on which the measuring mechanism 60 is mounted, the entire measuring mechanism can be turned bodily, so that its pointer 60' can be brought into any given angular position with respect to the camera and with respect to the diaphragm aperture scale 62 arranged on a stationary and preferably transparent support, located so as to be visible through a viewing window at the rear of the camera. This bodily turning of the measuring mechanism of the meter, by turning the supporting plate 58, thus serves to introduce the variable factors of exposure time and film speed into the mechanism.

Mounted on the supporting plate 58 is a stirrup-like pivoted clamping member 64 which, when actuated by a swinging arm 66, presses against the forward face of the pointer 60' and clamps it fast against the stationary plate 58 located just to the rear of the pointer. The movement of the clamping arm 66 is effected by the camera release member 74 in the form of a plunger suitably mounted on the camera body to be depressed by the finger of the operator when it is desired to make an exposure. When the plunger 74 is depressed, this compresses a spring 72 which pushes downwardly on a slidable sleeve 70, thereby moving the arm or link 68 connected to the swinging arm 66, to cause the swinging arm to clamp the pointer 60' in a stationary position so long as the downward pressure on the plunger 74 is continued. When the plunger is released to move upwardly again, a spring connected to the link 68 moves the sleeve 70 upwardly and moves the arm 66 so that the pointer 60' is no longer clamped.

On the supporting plate 58 there are two stop pins 76' and 76" which limit the range of swinging movement of the pointer 60'. The stop pin 76' serves also as a stop for a feeler member 78 which is fixed to a rotary shaft 78' and cooperates with the pointer 60' of the exposure meter. A spring 78" tends to turn the parts 78, 78' in a counterclockwise direction and to hold them in the extreme or limit position determined by the pin 76'. (The terms "clockwise" and "counterclockwise" as used herein, refer to directions of rotary movement as seen from a position in front of the camera, looking rearwardly; that is, looking from the right side of FIG. 1 toward the left thereof.)

The supporting plate 58 has two side wings 58' and 58" in a position to swing in front of and cover part of the diaphragm aperture scale 62, when the supporting plate 58 is swung a substantial angle one way or the other from its central position.

The shutter speed scale 23, the film speed scale 42, and the diaphragm aperture scale 62 are all arranged so that there is the same angular interval between successive steps or graduations of the scales which have a complementary effect on the exposure, so that a change of one graduation in the shutter speed or in the film speed, for example, will result in a change of one graduation or step in the reading of the diaphragm aperture scale 62. It will be obvious from what has been said above that when the shutter speed adjusting ring 22 is turned to alter the shutter speed, this will turn the ring 40 with it (on account of the coupling 46) and the rotation of the ring 40 will rotate the pinion 50 and the shaft 52, thereby turning the mounting plate 58 to change the position of the pointer 60' on the diaphragm aperture scale 62, to an amount compensating for the change in shutter speed.

It has already been mentioned that the cocking or tensioning shaft 30 carries a pinion 30' which meshes with gear teeth on the control ring 80, which corresponds with the control ring 76 in the third mentioned Patent 2,943,551. It should be made clear at this point that the present control ring 80 in the present case performs other functions in addition to the functions performed by the ring 76 in the patent, and it does not necessarily perform all of the functions of the ring in the patent.

For example, if the present invention is applied to a camera of the single lens reflex type, the present ring 80 may perform, among other things, the functions of opening the shutter blades and diaphragm leaves to maximum aperture during the focusing step. But if the present invention is applied to a camera which is not of the single lens reflex focusing type, then there is no need, of course, for this ring 80 to open the shutter up for focusing.

The present ring 80 is acted upon by a spring 80' which tends to turn the ring 80 in a counterclockwise direction to its rest or run-down position. A locking pawl 82 (corresponding, for example, to the latch 92 in said third patent) is operatively connected to the release plunger 74 and serves to drop behind a latching notch 80" on the ring 80, to hold the ring in its cocked or tensioned position until the release plunger is depressed, whereupon the locking pawl 82 is released.

Another projection 80a on the ring 80 serves, when the ring is turned in a clockwise direction, to engage an axially extending pin 84a fixed to the diaphragm control ring 84 which constitutes a diaphragm aperture adjusting member and which is rotatable about the optical axis as a center and which has the usual control slots for actuating the diaphragm leaves 86 which collectively make up an iris diaphragm. A spring 84b, acting on the pin 84a tends to turn the diaphragm control ring 84 in a counterclockwise direction, to the position of minimum diaphragm aperture.

The ring 80 also has a driving pin 80b so positioned that when the ring 80 is turned in a clockwise direction from its rest or run-down position, this pin will engage an arm 88b on a swinging lever 88 mounted on a stationary pivot, and turn this lever in a counterclockwise direction on its pivot, so that the other arm 88a thereof will push against an arm 90a of a swinging lever 90 fixed to the shaft 78' of the feeler member 78, the pressure being applied in a manner to turn this shaft 78' clockwise, by the clockwise rotation of the ring 80 and the consequent counterclockwise rotation of the lever 88. Right alongside of the lever 90, there is a locking pawl 92 rotatable on the shaft 78' and having a lug 92a constituting a locking tooth. Under the action of a coil spring 94 surrounding the end of the shaft 78', the parts 90 and 92 are held in coupling engagement, with the tooth 92a resting against one edge of the locking lever 90. The locking tooth 92a, depending on the position to which it is moved by rotation of the shaft 78', lies in the path of one or another of the step-shaped notches or abutments 84b' provided on the periphery of the diaphragm control ring 84.

In an externally accessible position on the circumference or periphery of the shutter housing, there is a rotatable ring 96 having on its inner edge a cam surface 96a and a radial abutment or stop projection 96b. The cam surface 96a cooperates with one arm of a double armed lever 98 which is turnable on a fixed pivot 98a, while the second arm 98b of this lever can swing into the path of movement of the arm 92b of the locking pawl 92. The shoulder or stop projection 96b on the ring 96 extends, in certain adjusted positions of the ring, into the path of an arm 84c on the diaphragm control ring 84.

The ring 96 also has a detent of known type to hold this ring frictionally in any given position in which it has been set. For instance, a spring loaded detent ball 100 may engage in any one of a series of notches 96c successively brought opposite the ball 100 by rotation of the ring 96. On the periphery of the ring 96 there are various suitable reference marks such as the mark "A" and a diaphragm aperture scale 96d, which cooperates with a stationary index mark 102.

This ring 96 serves as a switching member or controlling member to determine whether the diaphragm aperture is to be set automatically or manually, and if set manually, to determine at what aperture it is to be set. When the camera is to be used for automatic diaphragm setting, the ring 96 is turned to the position where the mark "A" lies opposite the mark 102. In this normal rest position, the cam surface 96a is inactive, so that the arm 98b of the lever 98 is out of the path of the arm 92b of the locking pawl 92 (the lever 98 being swung to this inactive position by a spring, not shown) and at the same time the stop shoulder 96b of the ring 96 lies beyond the range of movement of the arm 84c on the diaphragm control ring 84. Hence these parts do not interfere in any way with the intended motion of the pawl 92, which can move, with the rotation of the shaft 78', to any position determined by the engagement of the feeler 78 with the pointer 60' of the exposure meter. The locking pawl 92 partakes of the movement of the shaft 78' because the spring 94 tends to keep it in a given position with respect to the lever 90 which is fixed to the shaft 78'.

When the appropriate mechanism on the camera body (e.g., the film feeding or advancing mechanism) is operated to turn the tensioning shaft 30, the control ring 80 is also turned in a clockwise direction, and the portion 80a thereon will engage and carry with it the pin 84a on the diaphragm control ring 84, thereby moving it to its limit position in a diaphragm opening direction (position shown in dotted lines in FIG. 1) to open the diaphragm to maximum aperture. During this cocking or tensioning motion, the pin 80b on the control ring 80 also engages the arm 88b of the lever 88 and swings the latter in a counterclockwise direction so as to engage the portion 90a of the lever 90 and swing it and the shaft 78' clockwise. This clockwise movement of the lever 90 causes (through the spring 94) corresponding clockwise swinging of the stop pawl 92 until it comes to rest on the base circle of the diaphragm control ring 84. The clockwise turning of the arm 90 and shaft 78' also causes clockwise swinging of the feeler member 78 to its starting or initial position, ready to perform a feeling operation on the pointer 60' of the light measuring instrument.

Thus when cocking or tensioning the shutter mechanism (and simultaneously feeding the film, as disclosed for example in either of the first two United States patents above mentioned) the operator need merely see to it that the shutter speed is set to an appropriate value by rotation of the ring 22, and that the film speed ring 40 is properly set to reflect the speed of the film being used. Any rotation of the ring 40 (either by itself, or jointly with the ring 22) will turn the shaft 52, as above explained, and rotate the mounting plate 58 on which the light measuring instrument 60 is mounted, to vary bodily the position of the measuring instrument in accordance with the selected shutter speed and film speed. Then after the measurement of the light has been effected by the exposure meter in known manner, the pointer 60' of the exposure meter assumes a deflected position which indicates on the scale 62 the stop or diaphragm aperture which can subsequently be set by the automatic mechanism. If the pointer 60' does not appear in the field of the diaphragm scale (or that portion thereof which is not obscured by one or the other of the wings 58' and 58") this means that a diaphragm aperture corresponding to the previously selected shutter speed and film speed cannot be reached by the automatic mechanism. In such a case the operator must change the manually selected factors, as for example by changing the selected shutter speed, which will turn the measuring instrument until a possible diaphragm aperture value is indicated on the scale 62. For instance, in the position shown in FIG. 1, the pointer 60' indicates on the scale 52 that the required stop or diaphragm aperture is "8" and this can be set by the automatic mechanism.

After first making sure that an automatic setting is possible (by observing the position of the pointer 60' on the scale 62) the operator now depresses the release plunger 74. At the start of the downward movement of the plunger, the pointer 60' will be clamped stationary in the position which it had reached at that time. Then, upon further downward movement of the plunger, the pawl or latch 82 will be released, allowing the spring 80' to turn the control ring 80 in a counterclockwise direction. The control ring now starts to run down toward its rest position, this return motion being slowed down by suitable retarding mechanism such as the star wheel 104a fixed to the shaft 30, engaged by a vibrating pallet or anchor 104b. The slowing down of the return movement assures smooth operation, without excessive jar or vibration when one of the moving parts engages another, and prevents the parts from reaching such high velocity during the running down movement that there would be a serious rebound or possible damage at the end of the running down movement.

During this running down or return movement of the control ring 80, the parts 80a and 80b respectively release the parts 84a and 88b, so that the spring 78" is able to move the feeler 78 and the shaft 78' until the feeler comes into contact with the clamped pointer 60' of the measuring instrument. This rotation of the shaft 78' to a rotary position controlled by the exposure meter moves the tooth 92a to a position to cooperate with the proper one of the stepped abutments 84b' corresponding to the diaphragm aperture to be set. Simultaneously the release of the part 84a by the portion 80a of the control ring, allows the spring 84b to turn the diaphragm ring 84 in a counterclockwise direction until further counterclockwise movement is stopped by engagement of one of the steps 84b' with the tooth 92a, whereupon the further rotation of the ring 84 in a diaphragm-closing direction is stopped, and the diaphragm is set to the proper aperture, in this case the aperture f/8. Thus the steps 84b' on the adjusting member 84, in combination with the tooth 92a and the parts (90, 78', 78, etc.) which control the tooth, collectively constitute blocking mechanism for blocking return movement of the aperture adjusting member 84. This blocking mechanism may be regarded as comprising a first part (members 78, 78', 90) resiliently coupled by the spring 94 to a second part (members 92, 92a, 92b). The tooth 92a may be considered as an abutment or abutment arm engageable with the stepped abutments 84b' on ring 84, the position of the tooth upon engagement being dependent on the adjusted position of the shaft 78' and the other or first arm 90.

Since this setting movement of the locking tooth 92a from its tensioned position to the position controlled by the feeler 78 is a movement in a direction from the optical axis outwardly, and since the steps 84b' on the diaphragm control ring 84 also progress (when the ring turns in a running down direction) from the optical axis outwardly, there is no danger of the tooth 92a missing the proper stop or abutment that it is supposed to engage. The parts can be so proportioned that the running down movement of the ring 84 follows very closely the movement of the tooth 92a and the shaft 78'. In other words, it is not necessary to delay the movement of the ring 84 substantially behind the movement of the the shaft 78', nor to hold the ring 84 until the tooth 92a has been fully positioned, before allowing the ring 84 to begin to rotate. On the contrary, the present invention promotes speedy action of the parts, without danger of erroneous setting.

The first step of the stepped abutment 84b', starting at the base circle, corresponds to the largest diaphragm aperture of which the construction is capable; for example, in the illustrated embodiment, an aperture of f/2.8.

If it is desired to set the diaphragm aperture manually rather than automatically (for instance, when taking flash photographs) the switch ring 96 is moved in a clockwise direction from the automatic switch position "A." It can now be set to any desired diaphragm aperture, using the diaphragm aperture scale 96d in conjunction with the reference point 102. When this ring 96 is set to a selected diaphragm aperture position, the stop shoulder 96b engages the arm 84c of the diaphragm control ring 84 and holds the latter, upon running down from the extreme tensioned position, in the desired diaphragm aperture position. The movement of the ring 96 away from the automatic position also causes the cam surface 96a thereon to swing the locking lever 98 in a clockwise direction on its pivot, so that the arm 98b thereof engages the arm 92b on the locking tooth 92a, and swings this tooth against the force of the spring 94, to keep the tooth out of the path of the steps 84b', although still allowing the shaft 78' and the lever 90 to turn. In other words, the lever 98 serves to break or render ineffective the resilient coupling between the stop tooth 92a and the lever 90. The feeler 78, shaft 78' and lever 90 still carry out their same normal movements, just as in the case of automatic setting, but these movements do not cause the locking tooth 92a to determine the position of the diaphragm control ring 84.

Figure 3:
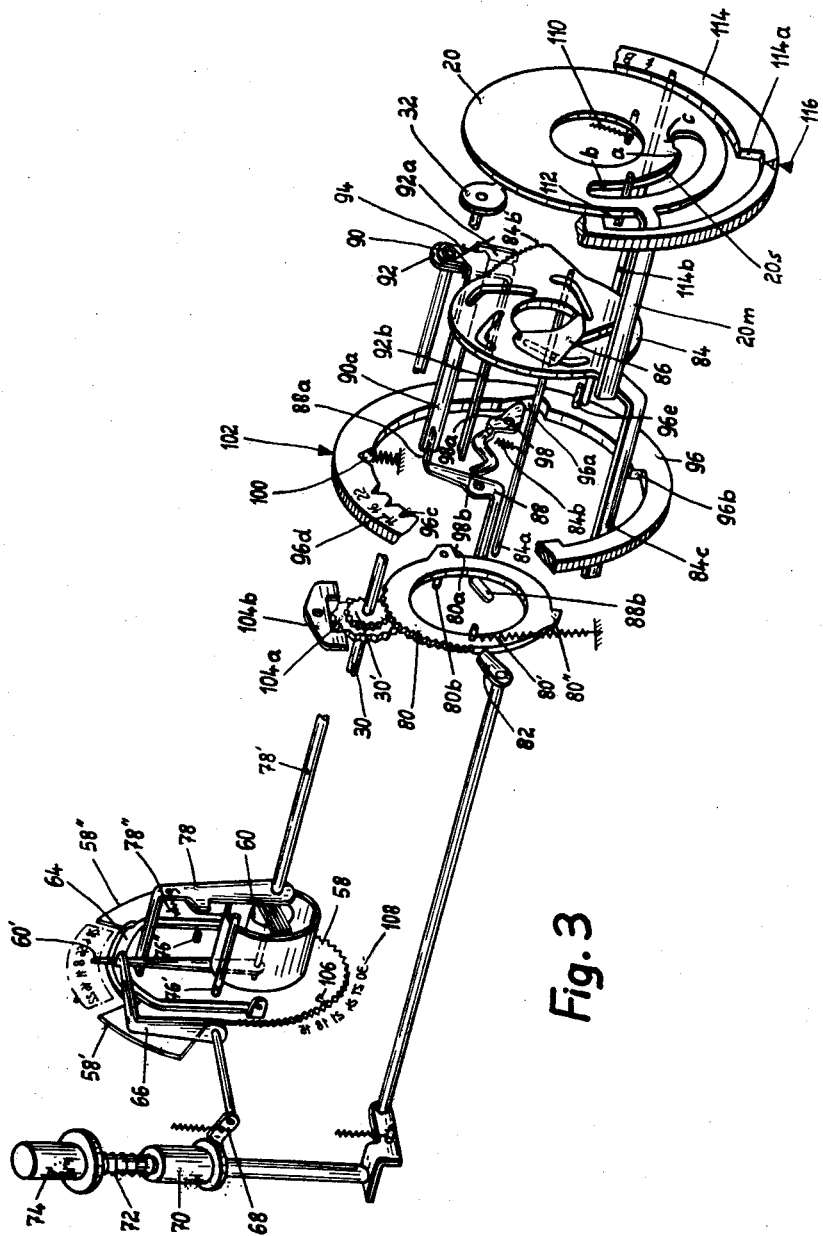
FIG. 3 is a view similar to FIG. 1 showing another embodiment of the invention in which both the shutter speed and the diaphragm aperture are set automatically.

Referring now to FIG. 3 of the drawings, there is shown another embodiment of the invention which completely automatic setting, of the shutter speed as well as the diaphragm aperture, can be effected. In this fully automatic form of the invention, the automatic diaphragm mechanism is so connected with the shutter speed setting device that a given time of exposure or shutter speed is normally associated with a given diaphragm aperture.

For example, for an exposure value of 18, a shutter speed of 1/500 of a second may be associated with a diaphragm aperture of f/22, and for progressively lower exposure values, there are progressively slower shutter speeds and progressively larger diaphragm apertures, until there is reached a shutter speed of 1/30 of a second and a diaphragm aperture of f/2.8, for an exposure value of 8.

In this embodiment of fully automatic setting, all actuation of the exposure meter by the shutter speed and film speed setting rings 20 and 41, is dispensed with, since it is sufficient to adjust the film speed factor by a manual turning of the plate 58 on which the measuring instrument of the exposure meter is mounted. For this purpose, a suitable part of the mounting plate 58 projects from the camera body so as to be manually accessible to the operator, and it is turned to set it to any desired film speed value, by bringing a reference mark 106 on the plate 58 opposite the desired graduation of the film speed scale 108 marked conveniently on the rear wall of the camera body or on a stationary portion visible through a window at the rear of the camera body.

The shutter speed setting ring 20 is, in this embodiment, rotatable about the optical axis and provided with a spring 110 which tends to turn it in a counterclockwise direction. The shutter speed control pin of the mechanism is indicated diagrammatically at 112, and as well understood in the art, the radial position of this pin with respect to the optical axis of the camera, determines the speed at which the exposure is made. Merely to mention one of many possible constructions, the pin 112 may correspond to the speed control pin 46 in United States Patent 1,687,123 of Deckel and Geiger, issued October 9, 1928. The speed control cam 20s on the ring 20 may correspond in function to the speed control cam 61 of the speed control ring 63 in the Deckel and Geiger patent just mentioned.

The speed control cam 20s has a portion a which, when opposite the pin 112, controls the shutter action to make an exposure of the longest duration which can be timed by the internal mechanism of the shutter; in this example, 1/30 of a second. From this point a, the speed control cam extends circumferentially in a clockwise direction and with a radial rise to the point b, which positions the pin 112 to determine the shortest exposure; for example, 1/500 of a second. In a counterclockwise direction from the point a, there is a widened part c of the cam, for controlling a "bulb" exposure, that is, an exposure which is timed manually rather than by the internal mechanism of the shutter. The action of the spring 110, in tending to turn the shutter speed control ring 20 in a counterclockwise direction, tends to bring the fastest shutter speed portion b of the cam opposite the pin 112, and also tends to hold an arm 20m on the disk 20 in engagement with an arm on the diaphragm aperture control ring 84, so that the speed control ring 20 cannot turn any farther in a counterclockwise direction than is permitted by the position of the diaphragm aperture control ring 84. When the diaphragm aperture control ring 84 is completely run down to its relaxed or rest position, which is the position for the smallest diaphragm aperture, the portion b of the cam 20s will be opposite the pin 112, setting the shutter for the shortest exposure. Rotation of the diaphragm control ring 84 in a clockwise direction (by action of the control ring 80, just as in the first embodiment) to its fully tensioned or largest diaphragm aperture postion, will serve, through the arm 20m, to turn the shutter speed control ring 20 to a position where the cam portion a is opposite the pin 112, setting the shutter for the longest internally timed exposure. At any intermediate position of the diaphragm aperture control ring 84, there will be a corresponding intermediate position of the cam 20s acting on the pin 112, to set the shutter for an intermediate speed of exposure.

When the shutter is cocked or tensioned, just as in the previous embodiment, the control ring 80 will be turned in a clockwise direction, which will cause corresponding clockwise turning of the diaphragm aperture control ring 84 to maximum aperture position, clockwise turning of the shutter speed control ring 20 to the slowest of the internally timed or "instantaneous" exposures, and clockwise turning of the shaft 78' to carry the feeler 78 to its initial starting position and to carry the tooth 92a to its initial starting position on the base circle of the ring 84, just in advance of the first abutmetn step 84b'. Then when the shutter release 74 is operated, the pointer 60' will be clamped just as in the previous embodiment, the control ring 80 will be unlatched so that its spring will rotate it counterclockwise toward its rest or run-down position (such movement being retarded by the escapement 104a, 104b) and the feeler 78 will cause the locking tooth 92 to be positioned to engage the appropriate step 84b' of the diaphragm aperture control ring, stopping the counterclockwise rotation of the diaphragm aperture control ring 84 at the appropriate point to set the appropriate size of aperture just as was done in the previous embodiment. But at the same time that the diaphragm aperture control ring 84 turns counterclockwise, the spring 110 turns the shutter speed control ring 20 likewise counterclockwise, to follow the motion of the diaphragm aperture control ring, thus making the exposure time progressively shorter and shorter as the diaphragm aperture becomes smaller and smaller. When this setting movement is completed, the final part of the counterclockwise rotation of the control ring 80 serves to release the master member or main drive member of the shutter (as explained in the first three United States patents mentioned) so that the shutter blades are opened and closed to make the exposure at the speed determined by the position of the control ring 20.

With this arrangement, it is unnecessary for the photographer, especially an amateur or inexperienced photographer, to pay any attention to the shutter speed factor, so that the usual shutter speed scale can be entirely omitted from the shutter, thereby simplifying it to avoid confusion to the untrained photographer.

In the simplest form of the invention, the shutter speed ring 20 and the diaphragm aperture ring 84 may be fixedly connected to each other, so that they always rotate together. However, the resilient coupling of these rings to each other, by means of the spring 110, is preferred because this enables the two rings to be oriented to a different position relative to each other if it is desired to take care of special situations, as for example taking flashlight pictures or time exposures. The embodiment illustrated in FIG. 3 provides for such disconnection of the shutter speed from the diaphragm aperture setting, when desired.

In this case the switching ring 96 no longer bears any mark "A" as in the first embodiment, but it does still bear the diaphragm aperture scale 96d. Another switching ring 114 is provided near the front of the shutter housing. It has a switching shoulder or abutment 114a, and also a driving pin 114b fixed to the ring 114 and extending axially rearwardly therefrom (that is, parallel to the optical axis), and it also carries switching symbols such as the designation "A" and "B" and the conventional flashlight symbol consisting of a schematic representation of a stroke of lightning, these designations cooperating with a stationary reference mark 116. A suitable catch device or detent (e.g., a spring pressed ball like the ball 100) holds the ring 114 in any position in which it is set, until sufficient force is exerted to overcome the detent and move it to another position.

When this switching ring 114 is in the position illustrated in FIG. 3 (that is, with the designation "A" opposite the index mark 116) the automatic mechanism for setting both the diaphragm aperture and the shutter speed is operative, and it operates in the manner already described. When the ring 114 is turned clockwise from this position, until the flashlight symbol is opposite the index mark 116, the shoulder or abutment 114a engages the arm 20m on the speed setting member 20 and displaces it clockwise to such extent as to bring the portion a of the cam 20s opposite the shutter speed control pin 112, to set the shutter for a speed of $\frac{1}{30}$ of a second. This clockwise movement of the shutter speed control ring 20 not only disengages the connection between the rings 20 and 84 (by moving the arm 20m away from the arm 84c) but also disengages the driver pin 114b on the ring 20 clockwise away from the pin 96e of the switching ring 96. Therefore it is now possible to move the switching ring 96 in a clockwise direction to any desired diaphragm aperture setting, without thereby affecting the position of the shutter speed control ring 20. The manual movement of the switching ring 96 in a clockwise direction from the automatic position indicated, serves in the same manner described above in connection with the first embodiment, to cause the cam 96a to swing the locking lever 98 to render the automatic diaphragm setting mechanism ineffective, and to cause the shoulder 96b to move the arm 84c of the diaphragm setting ring 84, to set the diaphragm aperture manually to any desired size, which can be selected by means of the diaphragm aperture scale 96d. Thus with each manual setting of the diaphragm aperture, there is now a constant shutter speed or exposure time of $\frac{1}{30}$ of a second, which is suitable for flashlight photography. As well understood in the art, the length of exposure in taking a flash photograph is really determined primarily by the duration of the flash itself, rather than by the time that the shutter blades remain open.

If the operator, on the other hand, wishes to retain full freedom of choice as to shutter speed, as well as freedom of choice as to diaphragm aperture, then he moves the switching ring 114 still further in a clockwise direction, until the designation "B" on the ring 114 comes opposite the reference mark 116. The parts operate in the same manner just described above, except that now the wide portion c of the cam opening will lie opposite the exposure speed controlling pin 112, and in this position the shutter is set for a "B" or bulb exposure, the time of which is manually controlled in the familiar manner. Thus the operator is free to make a bulb exposure at any desired speed (with limits of the speeds that can be timed manually, of course) and is also free to select any desired diaphragm aperture by appropriate rotation of the ring 96.

When the switching ring 114 is turned back in a counterclockwise direction to the position "A" the pin 114b again comes into engagement with the pin 96e and carries the switching ring 96 back in a counterclockwise direction to its automatic position shown in FIG. 3. Thus the return of the ring 114 to its position for automatic setting of the shutter speed serves simultaneously to return the diaphragm aperture switching ring to its automatic operating position, avoiding any possible error in manipulation.

In those cases where it is not necessary to provide for a "B" or bulb setting of the exposure time, a further simplification of the construction is possible by connecting the two switching rings 114 and 96 permanently to each other for joint rotation at all times. In other words, the pin 114b may be fixed to both of these rings. In this case, the section a of the speed control cam 20s is extended further in a counterclockwise direction, concentric with the axis of rotation of the ring 20, so that the shutter mechanism will be set for a speed of $\frac{1}{30}$ of a second through a suitable range of rotation of the ring 20, instead of just at one point. Thus when the ring 96 and the ring 114 are turned together in a clockwise direction from the automatic position to any one of the manual positions, the shutter will remain set at a speed of $\frac{1}{30}$ of a second throughout the entire range necessary for setting to any desired diaphragm aperture. In this case, the diaphragm aperture scale 96d can be marked directly on the ring 114 instead of on the ring 96, if desired, and may cooperate with the reference mark 116. In effect, the rings 96 and 114 thus become a single ring, and can indeed be formed as a single integral piece if desired.

Also it is possible to feed the film speed factor into the mechanism in any suitable known way, not necessarily by turning the entire mounting plate 58, and the same is true of feeding the shutter speed factor into the mechanism, in the case of the first type of construction. Thus for example either the shutter speed factor or film speed factor or both can be fed into the mechanism by using a variable resistance in the electrical circuit of the exposure meter, like the variable resistance shown in United States Patent 2,874,622 of Gebele, issued February 24, 1959.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

This invention is in the nature of an improvement on the invention disclosed in the copending United States patent application of Kurt Gebele, Serial No. 803,204, filed March 31, 1959, now Patent 3,044,376, granted July 17, 1962. Certain subject matter disclosed but not claimed herein is claimed in said copending application.

This application is a division of application Serial No. 842,145, filed September 24, 1959, now Patent 3,044,377, granted July 17, 1962.

What is claimed is:

1. A photographic camera including a diaphragm having an adjustable aperture and a diaphragm aperture adjusting member movable through a range to various positions for adjusting the diaphragm to various different aperture sizes, spring means tending to move said adjusting member to a rest position at one end of its range, means for moving said adjusting member to a tensioned position at the opposite end of its range, an exposure meter, blocking mechanism controlled by said exposure meter for blocking return movement of said aperture adjusting member from its tensioned position toward its rest position at a variable point depending upon the position of said exposure meter, a shutter, a shutter speed control member movable through a range from a rest position to a tensioned position, cooperating abutment portions on said aperture adjusting member and said speed control member so arranged that the position of said aperture adjusting member determines the extent to which said speed control member may move toward its rest position and that said aperture adjusting member may move toward its rest position without restraint from said speed control member, and separate spring means tending to move said speed control member from its tensioned position toward its rest position so far as permitted by the position at which said aperture adjusting member is stopped by said blocking mechanism, thereby resiliently coupling said speed control member to said aperture adjusting member to move therewith during movement of said aperture adjusting member to a position determined by said blocking mechanism.

2. A construction as defined in claim 1, further including a movable switching member cooperating with said speed control member and shiftable from a first position in non-interfering relation to the movements of said speed control member from its tensioned position toward its rest position, to a second position holding said speed control member stationary in a predetermined position notwithstanding movement of said aperture adjusting member from its tensioned position toward its rest position.

3. A construction as defined in claim 1, further including manually operable switching means for rendering said blocking mechanism ineffective, for selectively positioning said aperture adjusting member independently of said blocking mechanism, and for moving said shutter speed control member to a predetermined constant shutter speed setting.

4. In a photographic shutter assembly construction, the combination of a shutter speed control member movable through a range of travel including a plurality of positions determining a plurality of different shutter speeds, a diaphragm aperture control member movable through a range of travel including a plurality of positions determining a plurality of diaphragm apertures of different sizes, spring means applying force separately to said speed control member and said aperture control member and tending to move said speed control member toward a rest position at one end of its range and said aperture control member toward a rest position at one end of its range, releasable means for moving both of said control members from their rest positions to and holding both of them in respective tensioned positions against the force of said spring means, means for stopping return movement of one of said control members from tensioned position to rest position at a variable point depending upon illumination conditions of a photographic exposure to be made, and cooperating abutment means on said two control members and effective only in a direction to limit the return movement of the other of said control members by the position of the control member stopped at said variable point, to cause both of said control members to stop their return movements concomitantly at correlated points in their respective ranges of travel, said cooperating abutment means being ineffective to limit return movement of the control member which is stopped at said variable point.

5. In a photographic shutter assembly construction, the combination of a shutter speed control member movable through a range of travel including a plurality of positions determining a plurality of different shutter speeds, a diaphragm aperture control member movable through a range of travel including a plurality of positions determining a plurality of diaphragm apertures of different sizes, spring means tending to move said speed control member from a position of relatively slow shutter speed toward a position of faster shutter speed and separately tending to move said aperture control member from a position of relatively large diaphragm aperture toward a position of smaller aperture, releasable means for moving said speed control member to its position of slowest speed and said aperture control member to its position of maximum aperture and for holding said control members respectively in such positions until released for return movement under the influence of said spring means, cooperating abutment means on said two control members and effective only in a direction to limit movement of said speed control member under the influence of said spring means in one direction relative to said aperture control member so that as said aperture control member moves through positions of successively smaller apertures said speed control member may follow along with said aperture control member, if otherwise free to do so, through positions of successively faster shutter speeds with predetermined correlated relation between diaphragm aperture and shutter speed at any given moment during their return movements, means for stopping return movement of said aperture control member at a variable point, thereby stopping movement of said speed control member at a corresponding variable point as a result of the action of said abutment means when said speed control member is free to move with said aperture control member under the influence of said spring means, and switching means selectively effective to hold said speed control member against movement following along with said aperture control member.

6. A photographic shutter assembly construction comprising a diaphragm aperture control ring rotatable to any one of a successive series of positions representing a successive series of aperture sizes, a shutter speed control ring rotatable to any one of a successive series of positions representing a successive series of shutter speeds, rotation of both of said rings simultaneously in one direction serving to reduce the aperture and increase the shutter speed, rotation of both of them simultaneously in the opposite direction serving to increase the aperture and decrease the shutter speed, and resilient coupling means acting in a rotary direction for coupling said two rings to each other to turn together normally in the same relation of orientation with respect to each other, so that adjustment of said aperture control ring to any given position will normally be accompanied by adjustment of said speed control ring to a corresponding given position and so that as said aperture control ring is adjusted to successive positions in an aperture reducing direction, said speed control ring will simultaneously be adjusted to successive positions representing faster shutter speeds to produce shorter exposures, said resilient coupling means being so formed that restraint of rotation of said speed control ring in one direction will not restrain movement of the aperture control ring in the same direction.

7. A photographic shutter assembly construction comprising a diaphragm aperture control ring rotatable to any one of a successive series of positions representing a successive series of aperture sizes, a shutter speed control ring rotatable to any one of a successive series of positions representing a successive series of shutter speeds, rotation of both of said rings simultaneously in one direction serving to reduce the aperture and increase the shutter speed, rotation of both of them simultaneously in the opposite direction serving to increase the aperture and decrease the shutter speed, disengageable coupling means coupling said two rings to each other to turn together normally in the same relation of orientation with respect to each other, so that adjustment of said aperture control ring to any given position will normally be accompanied by adjustment of said speed control ring to a corresponding given position and so that as said aperture control ring is adjusted to successive positions in an aperture reducing direction, said speed control ring will simultaneously be adjusted to successive positions representing faster shutter speeds to produce shorter exposures, said disengageable coupling means comprising cooperating abutment parts on said two control rings and spring means tending to turn said shutter speed control ring to keep said abutment parts in contact with each other, so that rotation of said aperture control ring in one direction will apply force through said abutment parts to cause corresponding rotation of said speed control ring against the force of said spring means and so that during rotation of said aperture control ring in the opposite direction said spring means will normally cause said speed control ring to follow along with the rotation of said aperture control ring while said abutment parts remain in cooperative engagement with each other, and a manually operable shutter speed switching ring mounted for rotation concentrically with said speed control ring and having a portion for engaging said speed control ring to turn it and hold it against the rotative force of said spring means, thereby disengaging said disengageable coupling means.

8. A photographic shutter assembly construction comprising a diaphragm aperture control ring rotatable through a range of positions from maximum aperture to minimum aperture, a shutter speed control ring rotatable coaxially with said aperture control ring through an ordinary range of positions from a relatively slow internally timed exposure to a relatively fast internally timed exposure, said ordinary range of rotation of said speed control ring being of substantially the same angular extent as said range of rotation of said aperture control ring and being so related thereto that rotation of said speed control ring from said slow internally timed exposure toward a faster internally timed exposure is in the same direction of rotation as the rotation of said aperture control ring from maximum aperture toward minimum aperture, said speed control ring being capable of additional rotation beyond one end of its said ordinary range to a special purpose shutter speed position, a spring tending to turn said speed control ring from said special purpose position toward the opposite end of its ordinary range, another spring tending to turn said aperture control ring through its range in the same direction as that in which said speed control ring is turned by its spring, an abutment portion on said aperture control ring, a cooperating abutment portion on said speed control ring so arranged that when said aperture control ring is turned against the force of its spring to tension such spring, the abutment portion thereon will entrain the abutment portion on the speed control ring and cause corresponding rotation of the speed control ring against the force of its spring to tension such spring, releasable latch means for holding said aperture control ring in spring-tensioned position and thereby holding said speed control ring also in spring-tensioned position through the cooperative action of said abutment portions except when said speed control ring is otherwise held, a switching ring rotatable coaxially with said aperture control ring and said speed control ring, said switching ring having an ordinary exposure position in which it does not interfere with rotation of said speed control ring through its said ordinary range of rotation, said switching ring being rotatable from its said ordinary position to a special purpose position and having a portion for entraining said speed control ring during such rotation to turn said speed control ring to its said special purpose position, thereby separating the abutment portion on said speed control ring from the abutment portion on the aperture control ring and further tensioning the spring of the speed control ring, and stop means for determining the extent to which the spring of said aperture control ring may turn said aperture control ring in a running-down movement from its spring-tensioned position toward the opposite end of its range when said latch means is released, said speed control ring following along with the rotary movement of said aperture control ring with the abutment portion on the speed control ring remaining in spring pressure contact with the abutment portion on the aperture control ring when said switching ring is in its said ordinary position, said speed control ring remaining stationary in its special purpose position during running down movement of said aperture control ring when said switching ring is in its said special purpose position.

References Cited in the file of this patent
UNITED STATES PATENTS

| | | |
|---|---|---|
| 2,868,095 | Gebele | Jan. 13, 1959 |
| 2,906,166 | Herteich | Sept. 29, 1959 |
| 2,926,587 | Gebele | Mar. 1, 1960 |
| 2,984,164 | Melle | May 16, 1961 |
| 2,990,758 | Sauer | July 4, 1961 |